United States Patent
Jacobson et al.

(10) Patent No.: US 7,991,965 B2
(45) Date of Patent: Aug. 2, 2011

(54) TECHNIQUE FOR USING MEMORY ATTRIBUTES

(75) Inventors: Quinn A. Jacobson, Sunnyvale, CA (US); Anne Weinberger Bracy, Philadelphia, PA (US); Hong Wang, Fremont, CA (US); John P. Shen, San Jose, CA (US); Per Hammarlund, Hillsboro, OR (US); Matthew C. Merten, Hillsboro, OR (US); Suresh Srinivas, Portland, OR (US); Kshitij A. Doshi, Chandler, AZ (US); Gautham N. Chinya, Hillsboro, OR (US); Bratin Saha, San Jose, CA (US); Ali-Reza Adl-Tabatabai, Santa Clara, CA (US); Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/349,661

(22) Filed: Feb. 7, 2006

(65) Prior Publication Data

US 2007/0186055 A1 Aug. 9, 2007

(51) Int. Cl.
*G06F 13/376* (2006.01)
(52) U.S. Cl. ........................................... 711/144
(58) Field of Classification Search .................. None
See application file for complete search history.

(56) References Cited

U.S. PATENT DOCUMENTS

| | | | |
|---|---|---|---|
| 5,428,761 A | 6/1995 | Herlihy et al. | |
| 5,909,698 A | 6/1999 | Arimilli | |
| 5,974,438 A * | 10/1999 | Neufeld | 718/104 |
| 5,974,507 A * | 10/1999 | Arimilli et al. | 711/133 |
| 6,189,112 B1 * | 2/2001 | Slegel et al. | 714/10 |
| 6,332,181 B1 | 12/2001 | Bossen et al. | |
| 6,366,946 B1 * | 4/2002 | Christensen | 718/106 |
| 6,412,056 B1 | 6/2002 | Gharachorloo et al. | |
| 6,748,496 B1 | 6/2004 | Scarpino | |
| 6,854,039 B1 | 2/2005 | Strongin et al. | |
| 7,392,352 B2 * | 6/2008 | Mithal et al. | 711/147 |
| 2001/0025295 A1 | 9/2001 | Kawachiya et al. | |
| 2002/0087815 A1 | 7/2002 | Arimilli et al. | |
| 2003/0061452 A1 | 3/2003 | Nakada | |
| 2003/0182571 A1 | 9/2003 | Hashimoto et al. | |
| 2004/0255084 A1 * | 12/2004 | Day et al. | 711/145 |
| 2005/0138306 A1 * | 6/2005 | Panchbudhe et al. | 711/162 |
| 2005/0198637 A1 | 9/2005 | Kogan et al. | |
| 2007/0124546 A1 * | 5/2007 | Blanchard et al. | 711/152 |

(Continued)

FOREIGN PATENT DOCUMENTS

DE 10309919 9/2004

(Continued)

OTHER PUBLICATIONS

Fillo et al. "The M-Machine multicomputer, Proceedings of the 28th International Symposium on Microarchitecture" Mar. 1995, 14 pages.

(Continued)

*Primary Examiner* — Duc T Doan (74) *Attorney, Agent, or Firm* — Caven & Aghevli LLC (57) ABSTRACT

A technique for using memory attributes to relay information to a program or other agent. More particularly, embodiments of the invention relate to using memory attribute bits to check various memory properties in an efficient manner.

35 Claims, 4 Drawing Sheets

U.S. PATENT DOCUMENTS

2007/0169002 A1* 7/2007 Kronlund et al. ............. 717/130
2009/0328053 A1* 12/2009 Dice ............................. 718/104

FOREIGN PATENT DOCUMENTS

| EP | 1347384 A2 | 9/2003 |
|---|---|---|
| GB | 2451003 A | 1/2009 |
| JP | 3193684 | 5/2001 |
| JP | 3331592 | 7/2002 |
| KR | 1994-15822 | 7/1994 |
| WO | 01/56783 A | 2/2001 |
| WO | 03/054693 A1 | 7/2003 |

OTHER PUBLICATIONS

Bracy et al., "Disintermediated active communication, IEEE Computer Architecture Letters", vol. 5, No. 2, Jul.-Dec. 2006.

Office Action received for UK Patent Application No. GB0813998.2, mailed on Jun. 1, 2009, 6 pages.

Office Action received for German Patent Application No. 10 2007 006 190.2-53, mailed on Jun. 25, 2009, 19 pages inclusive of English translation.

Office Action received for Chinese Patent Application No. 200710101675.5, mailed on Feb. 6, 2009, 3 pages of office Action and 5 pages of English Translation.

Office Action received for Chinese Patent Application No. 2007101016755, mailed on Dec. 11, 2009, 6 pages of Office Action and 11 pages of English Translation.

Search Report received for GB Patent Application No. GB0702377.3, mailed on May 14, 2007, 7 pages.

Search Report received for GB Patent Application No. GB0702377.3, mailed on Mar. 4, 2008, 9 pages.

Office Action received for GB Patent Application No. GB0702377.3, mailed on May 1, 2008, 5 pages.

Office Action received for GB Patent Application No. GB0702377.3, mailed on Jul. 28, 2008, 5 pages.

Office Action received for German Patent Application No. 102007006190.2, mailed on Dec. 20, 2007, 8 pages.

Search Report received for GB Patent Application No. GB0813998.2, mailed on Nov. 6, 2008, 6 pages.

Office Action received for Korean Patent Application No. 10-2007-12870, mailed on Apr. 28, 2008, 5 pages of Office Action and 4 pages of English Translation.

Office Action received for Korean Patent Application No. 10-2007-12870, mailed on Mar. 31, 2009, 3 pages of Office Action and 2 pages of English Translation.

Office Action received for Taiwanese Patent Application No. 96104443, mailed on Mar. 11, 2010, 6 pages of Office Action including Search Report and 1 Page of English Translation of Search Report.

Office Action received for Japanese Patent Application No. 2007-028172, delivered May 25, 2010, 3 pages of translation and 2 pages of Japanese language office action.

* cited by examiner

FIG. 5

TECHNIQUE FOR USING MEMORY ATTRIBUTES

FIELD

Embodiments of the invention relate to microprocessors and microprocessor systems. More particularly, embodiments of the invention pertain to a technique to use, check, and set memory states or other information associated with one or more memory locations using attribute bits that correspond to the one or more memory locations.

BACKGROUND

In modern computing systems, microprocessors or microprocessor cores may access a vast memory address space, which may include a vast number of memory types. For example, an address range of memory in a computer system may store information that can only be accessed by a particular processor or processor core, whereas other address ranges may be accessed by multiple processors or processor cores. Exclusivity of memory is only one attribute that may be associated with a memory address range.

In some prior art systems, memory permissions or access rules may be controlled by the operating system (OS) via virtual memory management in a relatively course granularity of virtual memory pages. The granularity of virtual memory pages varies, in some prior art systems, from around 4 kilobytes (KB) through many megabytes (MB) in size. Changing the memory permissions may be an expensive operation in terms of system latency, die real estate, or system cost.

There may be situations in which a program wants to check a memory address before accessing it. For example, a program may check an address before accessing it when debugging programs, checking bounds and type safety in various computer programming languages (e.g., "Java"), profiling programs when analyzing their performance, or other reasons.

If a program checks an address according to a set of rules, it may use at least two prior art approaches: One approach is to use the OS to ensure addresses that do not meet the rules will be detected by the virtual memory management. In this approach the granularity may be restricted to the relatively coarse grain of the virtual memory management addressing scheme, and changing the access rules can be very costly. Another prior art approach is to perform a set of checks on an address within the program itself before using the address to access memory. The set of checks can compare the address against any set of rules at any granularity. The drawback of this prior art approach is that a substantial performance overhead may be paid for every memory reference to perform the appropriate checks.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to microprocessors and microprocessor systems. More particularly, embodiments of the invention relate to using memory attribute bits to check various memory properties in an efficient manner.

In one embodiment of the invention, memory attributes associated with a particular segment, or "block", of memory may be used indicate various properties of the memory block. For example, in one embodiment, there are associated with each block of memory attribute bits that may be defined by a user to indicate any number of properties of the memory block with which they are associated, such as access rights. In one embodiment, each block of memory may correspond to a particular line of cache, such as a line of cache within a level one (L1) or level two (L2) cache memory, and the attributes are represented with bit storage locations located with or otherwise associated with a line of cache memory. In other embodiments, a block of memory for which attributes may be associated may include more than one cache memory line or may be associated with another type of memory, such as DRAM.

Figure 1:
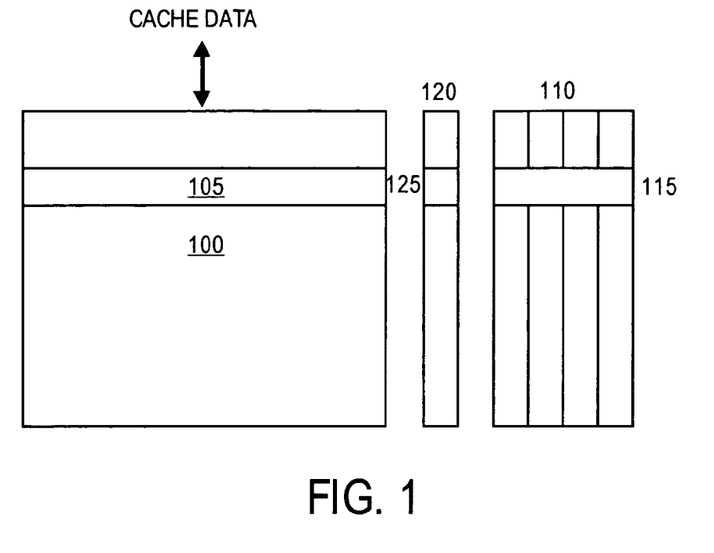
FIG. 1 illustrates a cache memory, in which various cache lines have associated therewith one or more attribute bits, according to one embodiment of the invention.

FIG. 1 illustrates a portion of cache memory, each line of which having an associated group of attribute bit storage locations, according to one embodiment of the invention. In particular, FIG. 1 illustrates a cache memory 100 including a cache line 105, which corresponds to a particular block of memory (not shown). The cache line 105 has associated therewith a number of attributes to be stored in the form of bits within storage location 110. In one embodiment, the storage location is a register file, whereas in other embodiments, another type of storage area may be used. Within the storage location 110 is a group of attribute bits 115 associated with cache line 105, which can store bits to represent various properties of the cache line, which can be used by a software program that accesses the cache line.

In the embodiment illustrated in FIG. 1, the group of attribute bits contains four bits, which may represent one or more properties of the cache line, depending upon how the attribute bits are assigned. For example, in one embodiment, the attribute bits indicate that the program has recently checked that the block of memory is appropriate for the current portion of the program to access. In other embodiments, the attribute bits may indicate that the program has recorded a recent reference to this block of memory for later analysis by a performance monitoring tools, for example. In other embodiments, the attribute bits may designate other permissions, properties, etc., In addition to the attribute bits, each line of cache may also have associated therewith a state value stored in state storage location 120. For example, in one embodiment the state storage location 120 contains a state bit 125 associated with cache line 105 which designates whether the cache line is in a modified state (M), exclusively owned state (E), shared state (S), or invalid state (I). The MESI states can control whether various software threads, cores, or processors can use and/or modify information stored in the particular cache line. In some embodiments the MESI state attribute is included in the attribute bits 115 for cache line 105.

In one embodiment, a cache memory, similar to that of FIG. 1, having associated attribute bits may be accessed by a number of cores in a multi-core processor, each able to execute a number of software threads issued from a sequencer within an operating system. By assigning the appropriate attribute bits with each cache line, each thread within each core of each processor in a computer system may have a line or multiple lines of cache that it can access, control, and/or modify.

Figure 2:
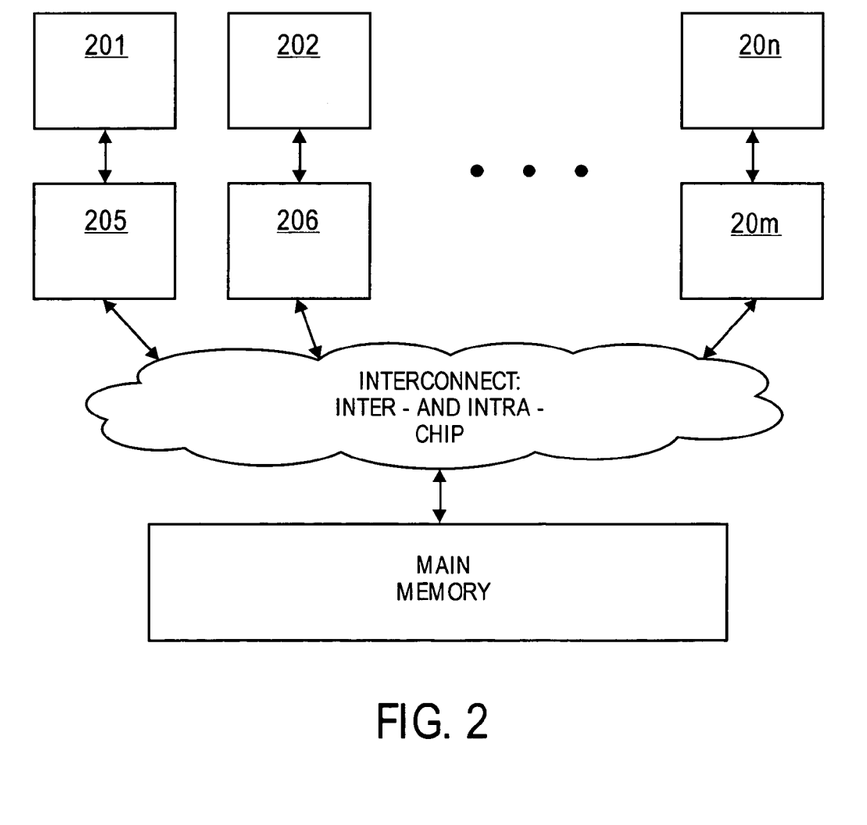
FIG. 2 illustrates a computer system memory hierarchy in which at least one embodiment of the invention may be used.

FIG. 2 is a conceptual illustration of how embodiments of the invention may simplify the organization of cache memory from the perspective of a thread of software executing on core of a processor within a computer system. For example, in FIG. 2 each thread can be conceptualized as a single thread core 201-20n having an associated cache memory 205-20m composed of cache lines that are designated to be controlled only by the particular corresponding thread running on the conceptual single-threaded core. For example, in one embodiment, the conceptual cache memories 205-20m may only have their MESI states modified by threads represented by single thread cores 201-20n. Although in reality each of the cache memories 205-20m may be composed of cache lines distributed throughout a cache memory or cache memories, conceptualizing the arrangement in the manner illustrated in FIG. 2 may be useful for understanding certain embodiments of the invention.

In one embodiment of the invention, attributes associated with a block of memory may be accessed, modified, and otherwise controlled by specific operations, such as an instruction or micro-operation decoded from an instruction. For example, in one embodiment an instruction that both loads information from a cache line and sets the corresponding attribute bits (e.g., "load_set" instruction) may be used. In other embodiments, an instruction that loads information from a cache line and checks the corresponding attribute bits (e.g., "load_check" instruction) may be used in addition to or a load_set instruction.

In still other embodiments, other instructions may be used to both control the attribute bits and access the corresponding cache data. For example, in one embodiment an instruction may be used that stores information to a cache line while either checking or setting (or both) the corresponding attribute bits (e.g., a "store_set" and/or "store_check" instruction). In some embodiments, instructions may be used to control or access the attribute bits that do not have an associated cache memory operation, such as load or store.

In the case of an instruction that checks the attributes associated with a cache line, one or more architectural scenarios within one or more processing cores may be defined to perform certain events based on the attributes that are checked. There may be other types of events that can be performed in response to the attribute check. For example, in one embodiment, an architectural scenario may be defined to compare the attribute bits to a particular set of data and invoke a light-weight yield event based on the outcome of the compare. The light-weight yield may, among other things, call a service routine which performs various operations in response to the scenario outcome before returning control to a thread or other process running in the system. In another embodiment, a flag or register may be set to indicate the result. In still another embodiment, a register may be written with a particular value. Other events may be included as appropriate responses.

For example, one scenario that may be defined is one that invokes a light-weight yield and corresponding handler upon detecting an unexpected memory state. This may be useful if a thread or other process attempts to access a line of cache expecting it to have a certain MESI state and instead the cache line is in another memory state, indicating that the cache line may not be associated with that particular thread or process. In this manner, only those cache lines for which a particular thread has control may be successfully accessed, modified, or checked. In other embodiments, other scenarios may be defined based on a check of cache line memory attributes. In other embodiments memory attributes of locations of finer granularity than the cache line may also be checked.

Figure 3:
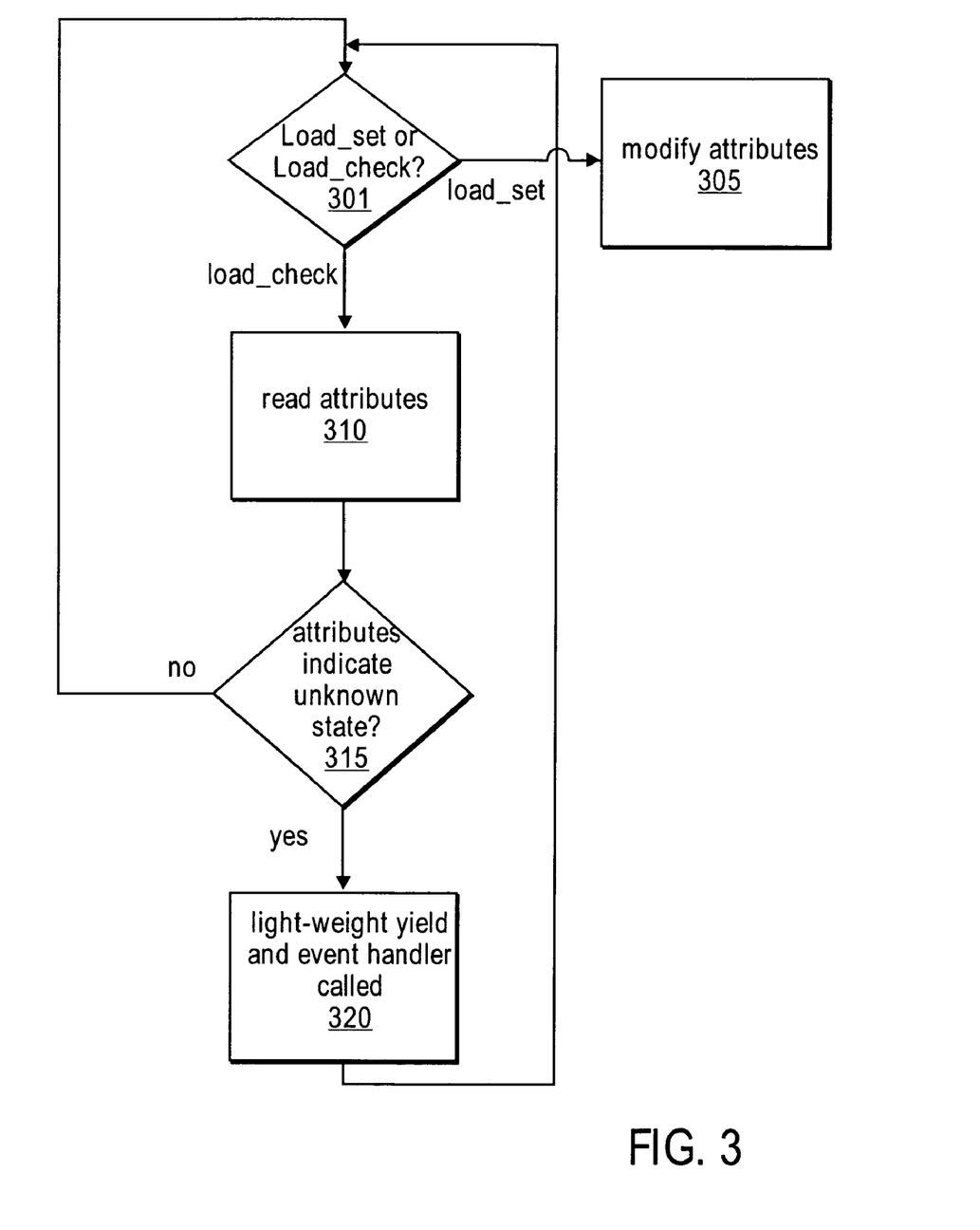
FIG. 3 is a flow diagram illustrating operations associated with checking attributes associated with one or more cache lines, according to one embodiment.

FIG. 3 is a flow diagram illustrating the operation of at least one embodiment of the invention in which a load_set and a load_check instruction is used to set or check attribute bits associated with a particular cache line or range of addresses within a cache line. In other embodiments, other instructions or uops may be used to perform the operations illustrated in FIG. 3. At operation 301, it is determined whether a load_set or load_check instruction is performed. If a load_set instruction is performed, the attribute bits associated with the cache line addressed by the load portion of the instruction are modified at operation 305. In one embodiment, the load_set instruction may include a load uop and a set uop, which are decoded from the load_set instruction. Other operations may be included with the load and set operations in other embodiments.

If the instruction being performed is a load_check instruction, then the attribute bits associated with the address specified by the load portion of the load_check instruction are read at operation 310. In one embodiment, the load_check instruction may include a load uop and a check uop, which are decoded from the load_check instruction. Other operations may be included with the load and check operations in other embodiments. At operation 315 a scenario is performed based on the state of the attribute bits. In one embodiment, the scenario checks to see whether the attribute bits read at operation 310 indicate an unknown state of the cache line. If so, then, at operation 320, an appropriate event occurs. In one embodiment, a light-weight yield occurs and an event handler routine is performed to perform operations in response thereto. After the event handler completes (or before the event handler completes in some embodiments) control returns to the instruction in program order following the instructions from where the light-weight yield occurred.

An alternative embodiment is that instead of checking the attribute bits, one simply reads the attribute bits into a register. This value can then be used by the program. One example would be that the program could compare this value and conditionally branch to different code paths depending on the value.

Figure 4:
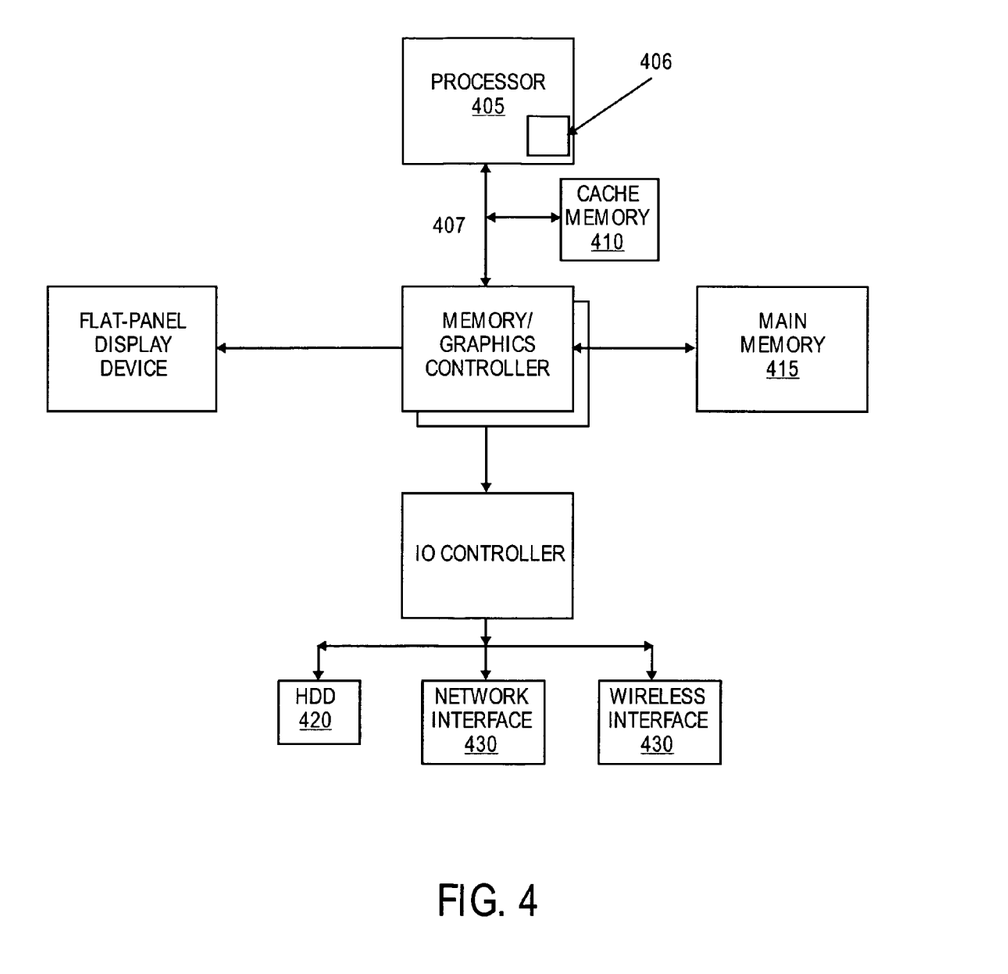
FIG. 4 illustrates a shared-bus computer system in which at least one embodiment of the invention may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 406 for machine state. In one embodiment storage area may be a set of registers, whereas in other embodiments the storage area may be other memory structures. Also illustrated in FIG. 4 is a storage area 407 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407.

Figure 5:
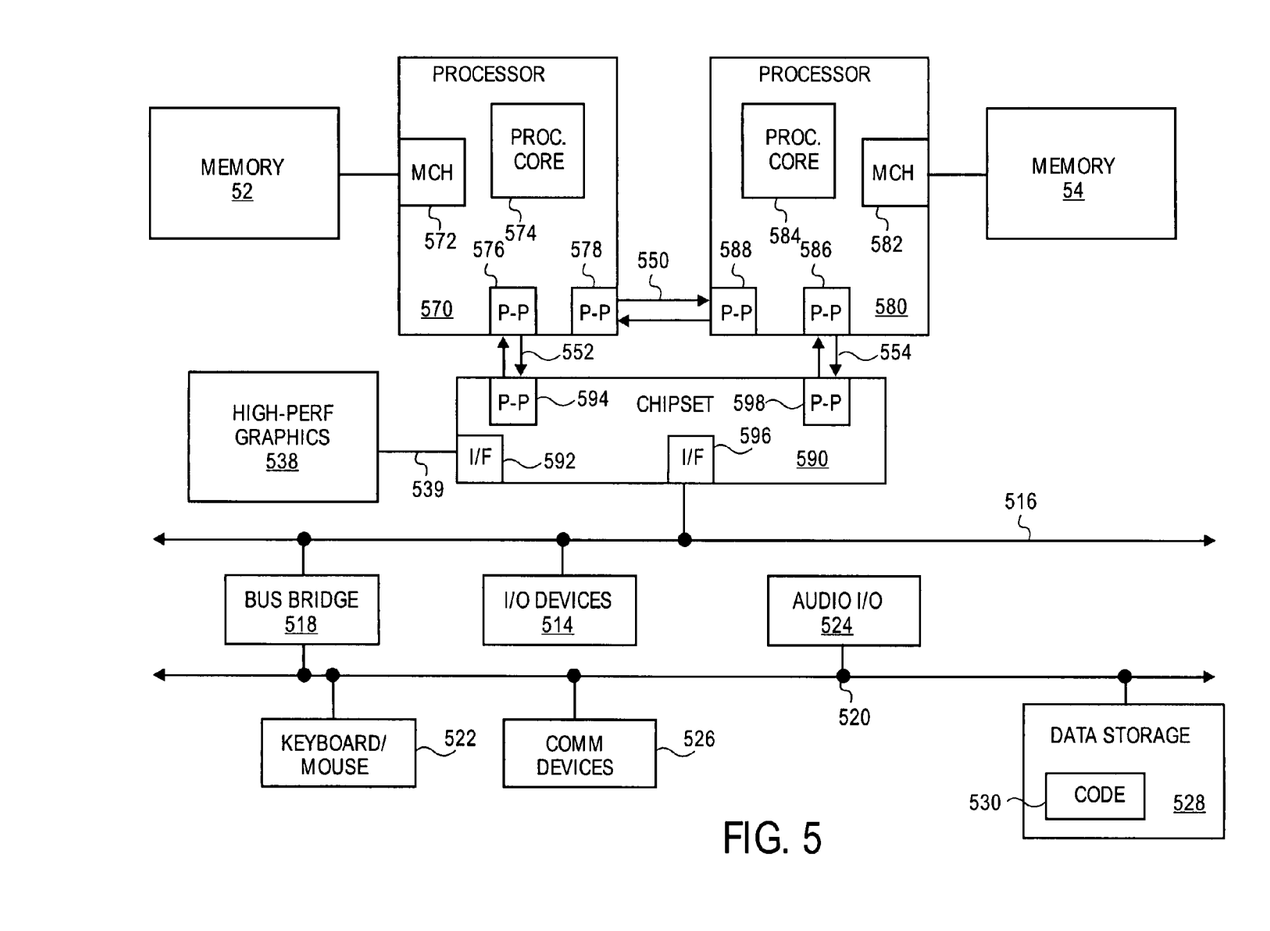
FIG. 5 illustrates a point-to-point bus computer system in which at least one embodiment of the invention may be used.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 22, 24. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. A processor comprising:
   a decoder to decode a load_check instruction; and
   an execution unit to execute the load_check instruction, wherein execution of the load_check instruction is to cause at least one user-configurable attribute bit stored in a cache line to be read from the cache line and compared with an expected value, wherein if the at least one user-configurable attribute bit does not equal the expected value, the load_check instruction is to cause a light-weight yield to occur and an event handler to be invoked upon detection of an unexpected memory coherency state, wherein the at least one user-configurable attribute bit is to indicate whether a thread of a multi-threaded program may access information stored in the cache line and whether the thread may modify the at least one user-configurable attribute bit.

2. The processor of claim 1, wherein the execution unit is to execute a load_set instruction to load information from the cache line and set a corresponding user-configurable attribute bit.

3. The processor of claim 1, wherein the decoder is to decode a load_set instruction to load information from the cache line and set a corresponding user-configurable attribute bit.

4. The processor of claim 1, further comprising a fetch unit to fetch the load_check instruction from a storage device.

5. The processor of claim 1, further comprising one or more processor cores to comprise one or more of the decoder and execution unit.

6. The processor of claim 1, further comprising one or more processor cores to comprise one or more of the decoder and execution unit, wherein the one or more processor cores are to perform one or more events based on the user-configurable attribute bit.

7. The processor of claim 6, wherein the event handler is to be performed if one or more attribute bits indicate that the corresponding cache line is in an unexpected state.

8. The processor of claim 1, wherein the cache line may be in one of a plurality of states consisting of: modified state, exclusive state, shared state, and invalid state.

9. The processor of claim 1, further comprising a cache memory to comprise the cache line.

10. An apparatus comprising:
    a memory block, the memory block having an associated set of user-defined attributes corresponding to only one software thread of a program having multiple software threads,
    wherein the attributes are to indicate which of the multiple software threads may access a corresponding cache line and which of the multiple software threads may modify the attributes, wherein the memory block is to be accessed in response to one or more of a load_set instruction or a load_check instruction, wherein the load_set instruction is to load information from a cache line and set an associated user-defined attribute bit and the load_check instruction is to load information from a cache line and check an associated user-defined attribute bit, wherein one or more operations, corresponding to events, are to be performed in response to the checked associated user-defined attribute bit, wherein if at least one of the associated set of user-defined attribute bits does not equal an expected value, the load_check instruction is to cause a light-weight yield to occur and an event handler to be invoked upon detection of an unexpected memory coherency state.

11. The apparatus of claim 10, wherein the set of attributes is to be stored outside a cache line within a cache memory.

12. The apparatus of claim 10, wherein the memory block is associated with a cache memory and the cache memory comprises a storage area of attribute bit storage areas to store the set of attributes.

13. The apparatus of claim 12, wherein the bit storage areas have at least one bit storage sub-area associated with only one cache line.

14. The apparatus of claim 13, wherein the set of attributes include information to indicate to which of the multiple software threads the only one cache line corresponds.

15. The apparatus of claim 14, wherein each cache line of the cache memory has associated therewith attribute bits.

16. The apparatus of claim 15, wherein the cache memory is a data cache.

17. The apparatus of claim 15, wherein the cache memory is a unified cache to store data and instructions.

18. A non-transitory machine-readable medium having stored thereon a set of instructions, including one or more of a load_set instruction and a load_check instruction:
wherein the load_check instruction, when executed by a processor, is to cause at least one user-configurable attribute bit stored in a cache line to be read from the cache line and compared with an expected value, wherein if the at least one user-configurable attribute bit does not equal the expected value, the load_check instruction is to cause a light-weight yield to occur and an event handler to be invoked upon detection of an unexpected memory coherency state, wherein the at least one user-configurable attribute bit is to indicate whether a thread of a multi-threaded program may access information stored in the cache line and whether the thread may modify the at least one user-configurable attribute bit.

19. The medium of claim 18, wherein the load_set instruction, when executed by a processor causes said processor to load information from a cache line and set an associated user-defined attribute bit.

20. The machine-readable medium of claim 18, wherein the processor is to determine the value of the attribute bit based on an architectural scenario within the processor.

21. The machine-readable medium of claim 20, wherein the scenario is to determine whether the cache memory line is in an unexpected state.

22. A system comprising:
a memory to store one or ore of a load_set instruction and a load_check instruction;
a decoder to decode a load_check instruction; and
an execution unit to execute the load_check instruction, wherein execution of the load_check instruction is to cause at least one user-configurable attribute bit stored in a cache line to be read from the cache line and compared with an expected value, wherein if the at least one user-configurable attribute bit does not equal the expected value, the load_check instruction is to cause a light-weight yield to occur and an event handler to be invoked upon detection of an unexpected memory coherency state, wherein the at least one user-configurable attribute bit is to indicate whether a thread of a multi-threaded program may access information stored in the cache line and whether the thread may modify the at least one user-configurable attribute bit.

23. The system of claim 22, wherein the execution unit is to execute the load_set instruction to load information from the cache line and set a corresponding user-configurable attribute bit.

24. The system of claim 22, wherein the decoder is to decode the load_set instruction to load information from the cache line and set a corresponding user-configurable attribute bit.

25. The system of claim 22, further comprising a fetch unit to fetch the load_check instruction from a storage device.

26. The system of claim 22, further comprising one or more processor cores to comprise one or more of the decoder and the execution unit.

27. The system of claim 22, further comprising one or more processor cores to comprise one or more of the decoder and execution unit, wherein the one or more processor cores are to perform one or more events based on the user-configurable attribute bit.

28. The system of claim 27, wherein the event handler is to be performed if one or more attribute bits indicate that the corresponding cache line is in an unexpected state.

29. The system of claim 22, wherein the cache line may be in one of a plurality of states consisting of: modified state, exclusive state, shared state, and invalid state.

30. The processor of claim 22, further comprising a cache memory to comprise the cache line.

31. The system of claim 22, wherein the load_set instruction and the load_check instruction are associated with only one software thread in a program including multiple software threads.

32. A method comprising:
storing at least one user-configurable attribute bit in a cache line;
decoding a load_check instruction; and
executing the load_check instruction, wherein execution of the load_check instruction is to cause the at least one user-configurable attribute bit stored in the cache line to be read from the cache line and compared with an expected value, wherein if the at least one user-configurable attribute bit does not equal the expected value, the load_check instruction is to cause a light-weight yield to occur and an event handler to be invoked upon detection of an unexpected memory coherency state, wherein the at least one user-configurable attribute bit is to indicate whether a thread of a multi-threaded program may access information stored in the cache line and whether the thread may modify the at least one user-configurable attribute bit.

33. The method of claim 32, further comprising determining a value of the attribute bit.

34. The method of claim 32, wherein the cache line corresponds to a software thread in a multi-threaded program.

35. The method of claim 32, further comprising decoding a load_set instruction into a plurality of micro-operations.

* * * * *

UNITED STATES PATENT AND TRADEMARK OFFICE
CERTIFICATE OF CORRECTION

| | | |
|---|---|---|
| PATENT NO. | : 7,991,965 B2 | Page 1 of 1 |
| APPLICATION NO. | : 11/349661 | |
| DATED | : August 2, 2011 | |
| INVENTOR(S) | : Quinn A. Jacobson | |

It is certified that error appears in the above-identified patent and that said Letters Patent is hereby corrected as shown below:

Column 7, Line 35, Claim 22: "ore" should be changed to --more--.

Signed and Sealed this
Eleventh Day of October, 2011

David J. Kappos
*Director of the United States Patent and Trademark Office*